3,469,118
HIGH VOLTAGE ELECTROSTATIC GENERATOR
Raymond G. Herb and James A. Ferry, Madison, Wis., assignors to National Electrostatics Corp., a corporation of Wisconsin
Filed June 15, 1966, Ser. No. 557,818
Int. Cl. H02n 1/00
U.S. Cl. 310—6                                        20 Claims

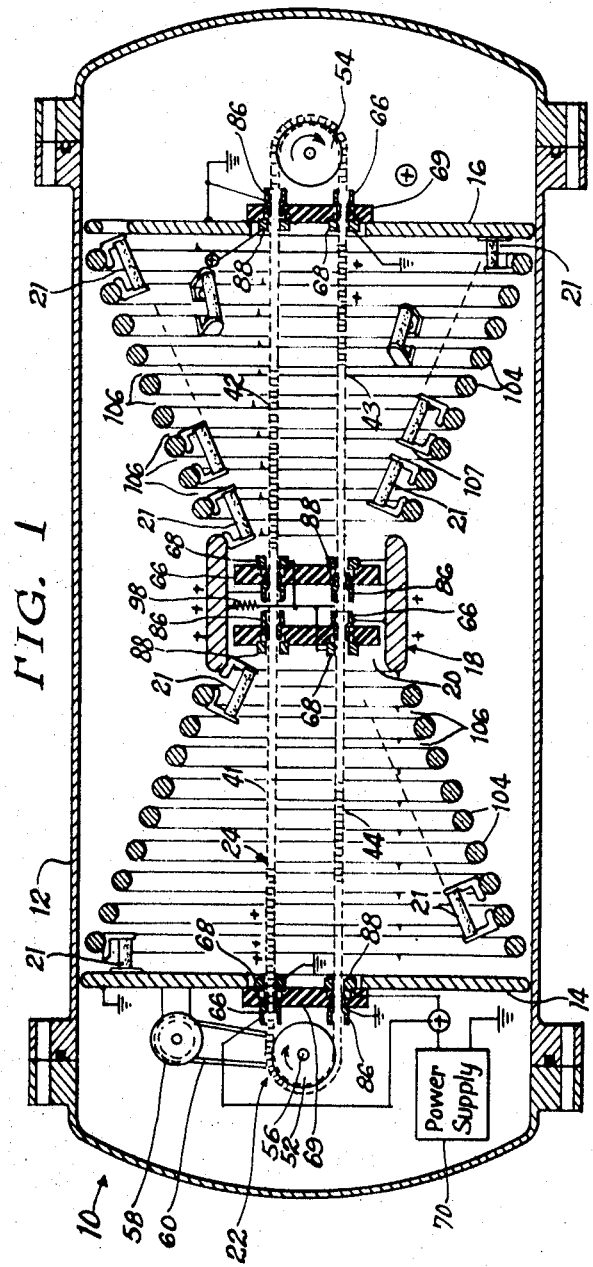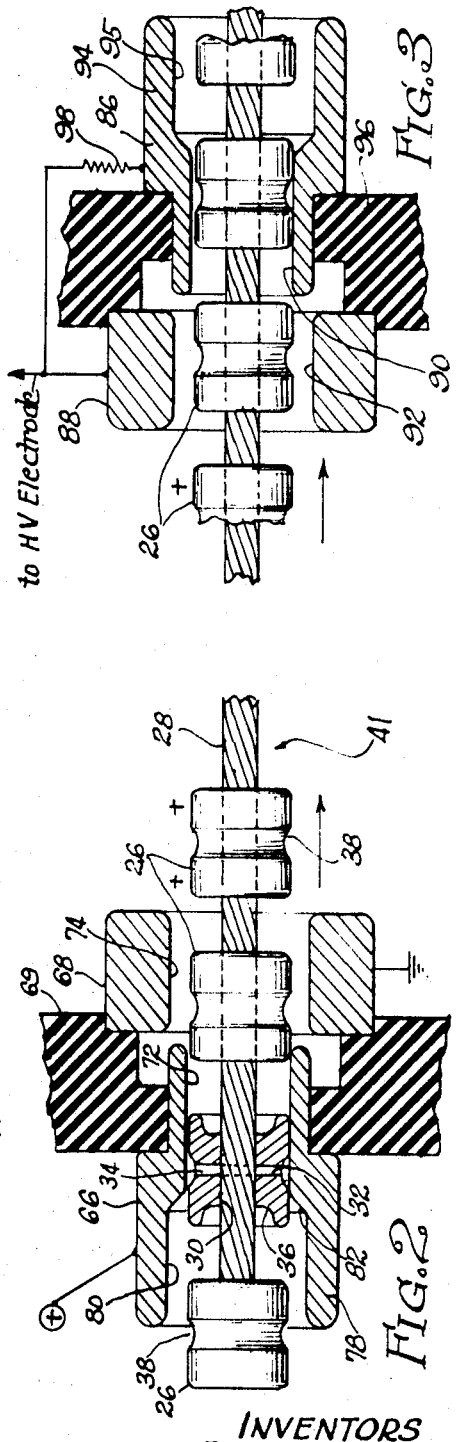

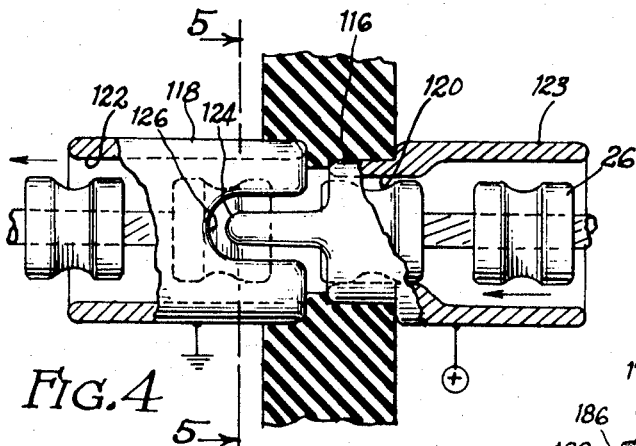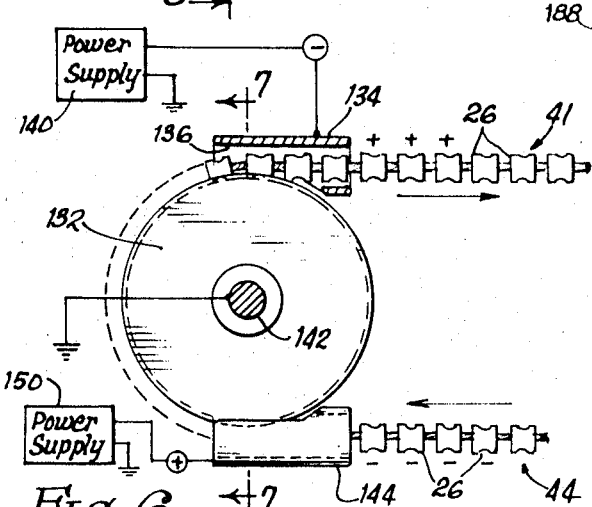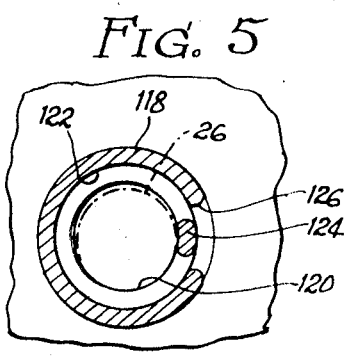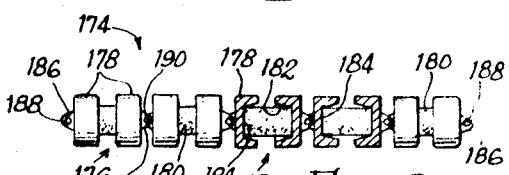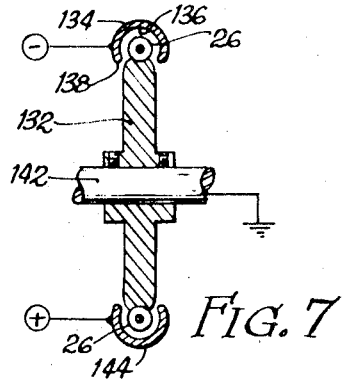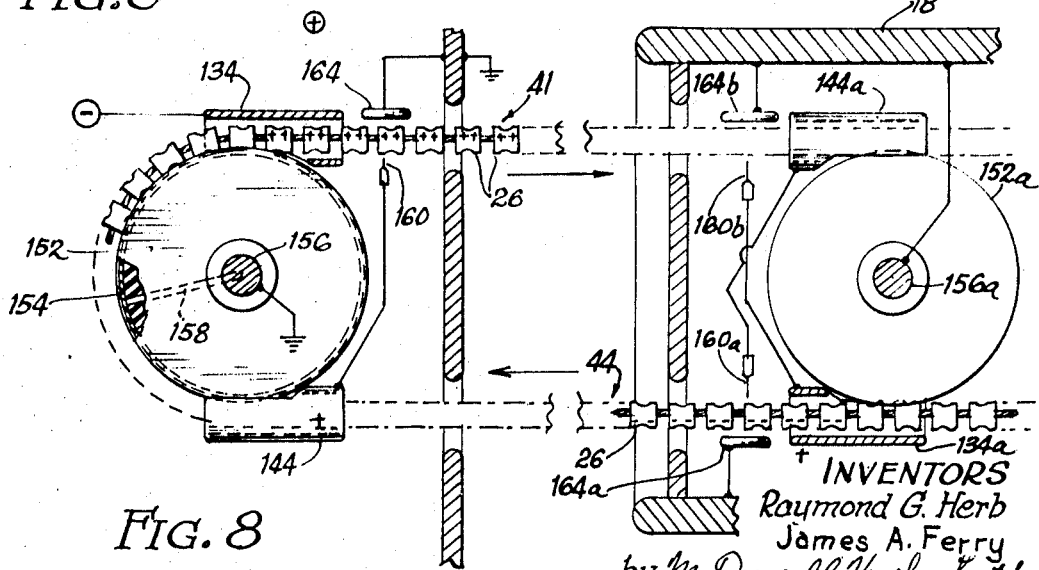

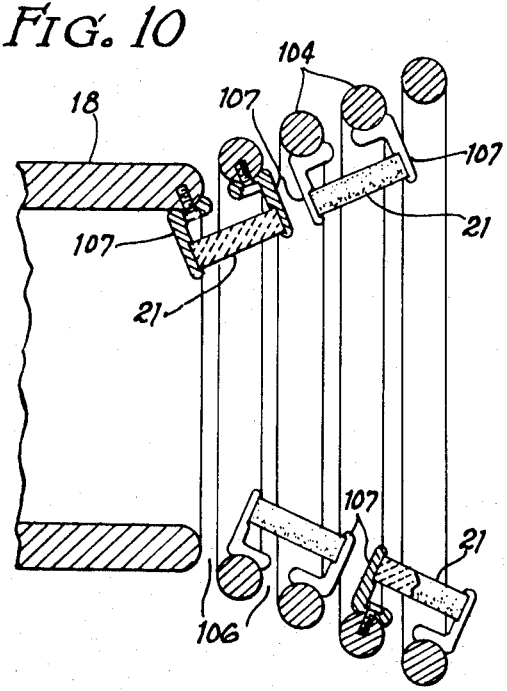
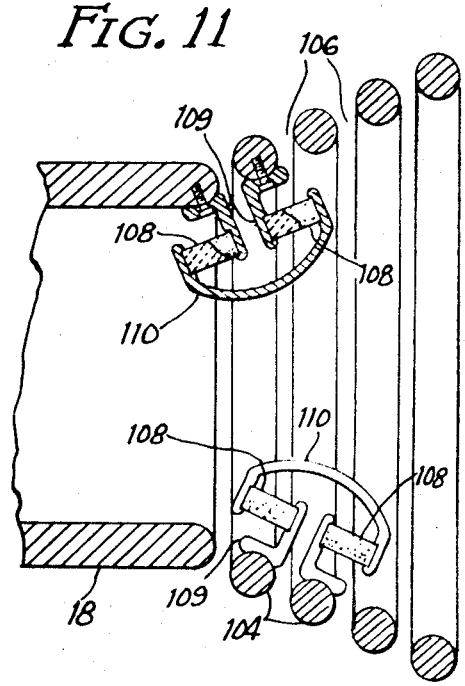
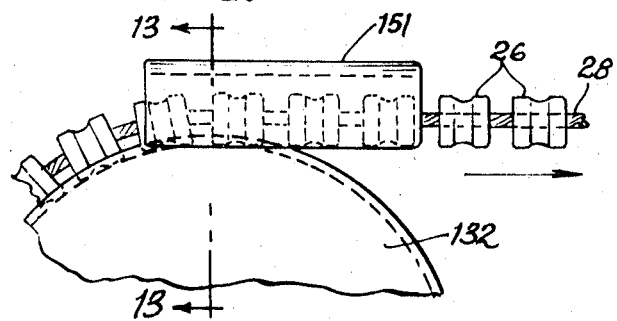
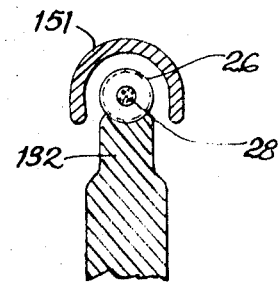
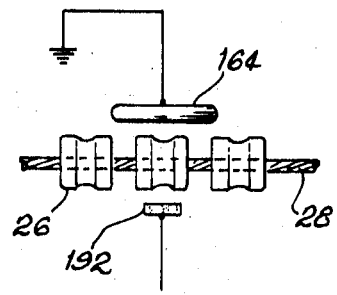
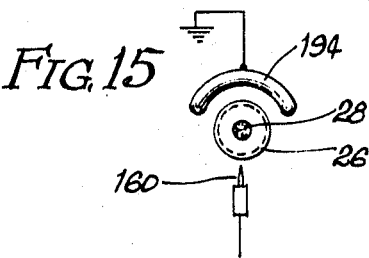
INVENTORS
Raymond G. Herb
James A. Ferry

United States Patent Office 3,469,118
Patented Sept. 23, 1969

ABSTRACT OF THE DISCLOSURE

The high voltage generator comprises a hollow high voltage electrode, to which charges are carried by an endless conveyor, comprising a series of conductive charge carrying pellets, spaced along the conveyor, with insulating elements extending between the pellets. To provide a high charge carrying capacity, the pellets are cylindrically symmetrical about the longitudinal axis of the conveyor, and are arranged to project outwardly in a radial direction from the insulating elements. In one embodiment, the pellets are in the form of generally cylindrical beads, spaced along an insulating cord, which provides the insulating elements. In another embodiment, the pellets and the insulating elements are interconnected to form an endless chain. The pellets may be charged by means of an induction electrode and a pellet contacting electrode. In one embodiment, such induction and pellet contacting electrodes are in the form of cylindrical sleeves through which the pellets travel. A high voltage is applied to the induction electrode. In another embodiment, the pellet contacting electrode is in the form of a conductive pulley, while the induction electrode comprises a channel-shaped member adjacent the pulley. Similar induction electrodes may be employed to bind the charges to the pellets just before the pellets are discharged to the high voltage electrode. Some or all of the induction electrodes may be supplied with high voltage by means of corona electrodes disposed adjacent the conveyor, along the opposite flight thereof from the pertinent induction electrode.

---

The development work leading to this invention was partially supported by the National Science Foundation, an agency of the United States Government.

This invention relates to high voltage generators of the electrostatic type.

In the usual type of electrostatic generator, an electrical charge is accumulated on a high voltage electrode which is insulated from ground. Electrical charges are carried to the high voltage electrode by means of an endless conveyor belt made of insulating material. The conveyor belt extends to the high voltage electrode from a support at ground potential. The belt extends into a chamber within the high voltage electrode, which is of hollow construction. By means of a corona discharge electrode, charges are sprayed onto the belt adjacent the grounded support. As the belt passes through the chamber within the high voltage electrode, the charges are removed from the belt and transferred to the high voltage electrode.

Electrostatic generators are capable of producing extremely high voltages ranging up to several million volts. Such high voltage generators have been widely used for operating linear accelerating tubes in which protons, electrons, deuterons or other charged particles are accelerated to extremely high energies. The high-energy particles may then be employed to carry out various studies in nuclear physics or to generate high energy rays for medical, industrial and other uses.

One object of the present invention is to provide a new and improved electrostatic generator in which the charging belt is replaced with one or more endless strings of conductive pellets which are insulated from one another and are adapted to carry charges to the high voltage electrode.

A further object of the present invention is to provide such a new and improved high voltage generator in which the pellets are mounted at regular intervals on an endless cord or strand made of flexible insulating material.

It is a further object to provide a new and improved high voltage generator having a charging conveyor utilizing one or more pellet strings which are highly resistant to damage due to sparking or flash-over.

Another object is to provide such a new and improved high voltage generator in which the charge-carrying pellet strings may be operated at extremely high speed, and will afford exceptionally long and trouble-free service.

It is a further object of the present invention to provide a high voltage generator of modified construction in which the charge-carrying pellets are mounted on the links of an endless chain, with insulating elements connected between the pellets.

Another object is to provide a new and improved high voltage generator in which the charge-carrying pellets are charged and discharged by means of charging and discharging electrodes which actually engage the pellets, and in which induction electrodes are provided adjacent the charging and discharging electrodes to prevent any substantial sparking between the pellets and the charging and discharging electrodes. In this way, damage to the charging and discharging electrodes, due to sparking, is eliminated.

Another object is to provide a new and improved high voltage generator in which the charge-carrying pellet string has at least a first flight which carries charges of one sign to the high voltage electrode, and at least a second flight which carries charges of the opposite sign from the high voltage electrode, and in which the induction voltages for some of the induction electrodes are provided by corona electrodes which transfer charges from the pellets to the induction electrodes.

A further object is to provide a new and improved high voltage generator in which the charge-carrying pellets are charged and discharged by means of conductive sheaves or pulleys, in conjunction with induction electrodes which prevent sparking at the pulleys.

It is a further object to provide a high voltage generator of the foregoing character in which the induction electrodes are arranged and connected so that the pulley on the grounded support may be grounded, while the pulley on the high voltage electrode is connected directly to the electrode.

Further objects and advantages of the present invention will appear from the following description, taken with the accompanying drawings, in which:

FIG. 1 is a diagrammatic longitudinal section of a high voltage generator to be described as an illustrative embodiment of the present invention.

FIG. 2 is an enlarged longitudinal section taken through one of the charging electrodes and the associated induction electrode for the pellet string.

FIG. 3 is an enlarged longitudinal section taken through one of the discharging electrodes and the associated induction electrode, within the high voltage electrode.

FIG. 4 is an elevational section taken through a modified charging system for the pellet string.

FIG. 5 is a cross-sectional view taken generally along the line 5—5 in FIG. 4.

FIG. 6 is an elevational sectional view showing another modified charging system which employs a pulley as a charging and discharging electrode.

FIG. 7 is a sectional view taken generally along the line 7—7 in FIG. 6.

FIG. 8 is an elevational section showing still another modified charging system utilizing pulleys as charging and discharging electrodes, along with corona electrodes to transfer charges from the pellets to some of the induction electrodes.

FIG. 9 is an elevational section showing a modified charge-carrying conveyor, in which the pellets are mounted on the links of an endless chain, with insulating members between the pellets.

FIG. 10 is a fragmentary enlarged longitudinal section showing details of the insulating supports for the high voltage electrode of the high voltage generator shown in FIG. 1.

FIG. 11 is a view similar to FIG. 10 but showing a modified insulator construction.

FIG. 12 is a fragmentary elevational view similar to FIG. 6 but showing a modified construction.

FIG. 13 is a fragmentary section taken generally along the line 13—13 in FIG. 12.

FIG. 14 is a fragmentary enlarged elevational view similar to a portion of FIG. 8 but showing a modified construction.

FIG. 15 is a fragmentary section showing another modified arrangement, similar to that shown in FIG. 8, for deriving induction voltages from the charged pellets.

As already indicated, FIG. 1 illustrates a high voltage generator 10 of the electrostatic type. The generator 10 will find many applications, but is especially well adapted to provide an extremely high voltage to accelerate charged particles in an evacuated acceleration tube, to carry out studies in nuclear physics, or to generate high-energy X-rays. It will be seen that the high voltage generator 10 is housed within a pressure tank 12. In this way, the generator 10 may be surrounded by a high pressure atmosphere, so as to provide greatly improved resistance to high voltage flash-overs. In this way, the high voltage generator 10 may be operated at a much higher voltage than would be possible in air at normal atmospheric pressure. The high pressure atmosphere within the tank 12 may contain or consist of a gas, such as sulphur hexafluoride, for example, having an extremely high dielectric strength. The use of pure sulphur hexafluoride is preferred. Other gases have been used and are known in the art to increase the insulating value of the atmosphere around the high voltage generator. The tank 12 is normally made of steel or other metal and is maintained at ground potential.

Within the tank 12 the high voltage generator 10 comprises vertical supporting walls or members 14 and 16 which are mounted near the ends of the tank and are also grounded. An insulated high voltage electrode 18 is mounted near the center of the tank 12. The high voltage electrode 18 is hollow and thus is formed with a chamber 20 therein. All of the surfaces of the high voltage electrode 18 are smoothly curved and rounded to avoid undue concentration of the electric field around the high voltage electrode. In this way, the possibility of sparking between the high voltage electrode 18 and the tank 12 is minimized. The illustrated high voltage electrode 18 and the tank 12 is generally cylindrical in form, and the chamber 20 within the electrode is in the form of a cylindrical bore which is open at both ends.

The high voltage electrode 18 is capable of accumulating electrical charges to an extremely high voltage. Insulators 21 are provided to support the high voltage electrode 18, as will be described in greater detail presently. The acceleration tube or other device to be operated by the high voltage is connected between the high voltage electrode 18 and the tank 12.

A conveyor 22 is provided to carry successive electrical charges to the high voltage electrode 18. The charges carried by the conveyor 22 are accumulated on the high voltage electrode 18 so that the voltage of the electrode builds up to an extremely high value.

In the ordinary electrostatic generator, the charge-carrying conveyor takes the form of an ordinary belt made of insulating material. However, in the illustrated high voltage generator 10, the conventional belt-type conveyor is replaced with the illustrated conveyor 22 having one or more endless members 24 with a series of conductive pellets 26 mounted thereon. The illustrated pellets 26 are circular in cross section and are generally cylindrical in shape. Here again, all surfaces of the pellets 26 are smoothly curved or rounded so as to minimize the possibility of sparking or corona discharges between the pellets.

In the construction shown to advantage in FIGS. 2 and 3, the pellets 26 are strung onto and secured to a flexible cord or tension member 28 which may comprise one or more strands of flexible insulating material. Preferably the cord 28 comprises a large number of twisted strands of nylon or similar material. Each pellet 26 is formed with an axial bore 30 to receive the cord 28. Each of the illustrated pellets 26 also has a bore 32 of small diameter extending diametrically to receive therethrough a pin 34 which extends diametrically through the cord 28 so as to secure the pellet to the cord. The pin 34 may be tapered and may be press-fitted into the bore 32 so that the pin will be securely retained therein.

The cord 28 may also be tightly fitted within the bore 30 in each pellet 26 so that the pellet will be frictionally retained on the cord. An extremely tight fit may be obtained by stringing the pellets 26 on the cord 28 while the cord is loosely twisted or entirely untwisted. After all of the pellets have been mounted on the cord 28, the cord may be tightly twisted. This has the effect of increasing the diameter of the cord while shortening its length. The cord 28 may thus be expanded in diameter to fit very tightly within the bore 30 of each pellet 26.

Circular dish-shaped cavities 36 are formed in the ends of the illustrated pellets 26. These cavities 36 have the effect of increasing the distance along the cord 28 between the pellets, so as to increase the insulating value of the cord. This construction also increases the flexibility of the endless member 24.

Each of the illustrated pellets 26 is also formed with a centrally disposed annular groove 38 in its outer surface. The ends of the diametrical bore 32 communicate with the groove 38. In this way, the ends of the pin 34 are recessed within the groove 38, so as to minimize the possibility of sparking or corona discharges at the ends of the pin.

The endless member 24 of the charge-carrying conveyor 22 normally has at least two flights extending to the high voltage electrode 18 from one of the grounded supports. In the illustrated construction, the endless member 24 actually has four such flights 41, 42, 43 and 44. This is brought about by arranging the endless member 24 so that it passes through the cylindrical chamber 20 within the high voltage electrode 18. The endless member 24 is trained around pulleys 52 and 54 which are mounted on the grounded end plates 14 and 16. Either or both of the pulleys 52 and 54 may be power driven. In this case, the pulley 52 is mounted on a shaft 56 which is driven by an electric motor 58 through a suitable belt drive 60.

The endless member 24 extends along the flight 41 between the pulley 52 and the high voltage electrode 18, and then along the flight 42 to the pulley 54. The endless member 24 returns from the pulley 54 along the flight 43 to the high voltage electrode 18 and then along the flight 44 to the pulley 52.

One or more of the flights 41–44 may be employed to charge the high voltage electrode 18. Of course, it is preferred to employ all four of the flights 41–44 to provide a maximum charging rate. With this arrangement, the flights 41 and 43 carry charges of one sign to the high voltage electrode 18 from sources of charge adjacent the grounded supports 14 and 16. The flights 42 and 44 carry charges of the opposite sign from the high voltage electrode 18 to the grounded supports 14 and 16. The illustrated machine is arranged so that positive charges are carried by the flights 41 and 43, while negative charges are carried by the flights 42 and 44. Thus, the high positive voltage is produced on the high voltage electrode 18.

FIGS. 2 and 3 illustrate advantageous arrangements for charging and discharging the charge-carrying pellets 26 of the endless member 24. These arrangements have the important advantage of substantially preventing any sparking between the pellets and the charging and discharging electrodes. Such sparking would quickly damage the electrodes.

FIG. 2 illustrates the arrangement for charging the pellets 26 at the beginning of the outbound flight 41 between the pulley 52 and the high voltage electrode 18. The same arrangement is employed to charge the pellets at the beginning of the flight 43 between the pulley 54 and the high voltage electrode 18.

It will be seen that the charging arrangement of FIG. 2 comprises a charging electrode 66 and a closely spaced induction electrode 68 disposed along the beginning of the flight 41, at or near the grounded support 14. A suitable insulating support 69 may be provided on the supporting wall 14 to support the electrodes 66 and 68. The pellets 26 actually engage or contact the charging electrode 66. However, the induction electrode 68 is spaced outwardly from the path of the pellets 26. A power supply 70 is employed to produce a high charging voltage between the charging electrode 66 and the induction electrode 68. A charging voltage of 10,000 to 50,000 volts is typical, but, of course, the charging voltage may be varied as desired.

The electrodes 66 and 68 are preferably in the form of coaxial sleeves, through which the pellets 26 are adapted to pass. The charging electrode 66 has a bore 72 therein which is slidably engaged by the pellets 26. A larger bore 74 is formed in the induction electrode 68, so as to be spaced outwardly from the pellets. The electrodes 66 and 68 are arranged end to end with a small space therebetween, the spacing being sufficient to prevent any flashover between the electrodes.

The charging electrode 66 may be coated or impregnated with graphite or other lubricant to minimize wear between the pellets 26 and the electrode 66. The pellets 26 are smoothly finished and are made of a hard material, such as hardened steel, so that they will be highly resistant to wear.

The charging electrode 66 has an enlarged end portion or entrance housing 78 through which the pellets 26 travel before entering the bore 72. The entrance housing 78 has a bore 80 therein which is enlarged relative to the bore 72. A flaring annular wall 82 extends between the bore 72 and the enlarged bore 80 to guide the pellets into the bore 72.

As illustrated in FIG. 2, the charging electrode 66 is at a high positive voltage relative to the induction electrode 68, which is grounded. Each pellet 26 moves through the enlarged entrance housing 78 and then into the bore 72, where the pellet contacts the charging electrode 66. The enlarged entrance housing 78 acts as a shield to prevent any substantial sparking between the pellet and the charging electrode 66. The enlarged entrance housing 78 is long enough to produce a field free space therein of a size corresponding to the size of the pellet 26, so that substantially the entire pellet moves into the field free space before the pellet contacts the charging electrode 66. Thus, there is no substantial voltage difference between the pellet and the inside of the charging electrode 66 to produce a spark at the moment of contact between the pellet and the bore 72. The pellet is not carrying a charge at this point, so that there is no abrupt flow of current between the pellet and the charging electrode 66.

As each pellet 26 emerges from the charging electrode 66 and passes into the induction electrode 68, a positive charge is drawn into the emerging end of the pellet by the electric field between the induction electrode 68 and the charging electrode 66. Because of this displacement of the positive charge toward the leading end of the pellet, there is only a smooth flow of current between the charging electrode and the pellet when the pellet breaks contact with the charging electrode. The provision of the induction electrode 68 prevents any abrupt flow of current at this point, and thus prevents any substantial sparking between the pellet and the charging electrode.

Thus, the charging and induction electrodes 66 and 68 are constructed and arranged in such a manner as to prevent any substantial sparking between the pellets 26 and the charging electrode 66, when the pellets make and break contact with the charging electrode. This is an important feature, because such sparking would rapidly erode the charging electrode.

Because of the positive polarity of the charging voltage, positive charges are transferred to the pellets 26 in the arrangement of FIG. 2. Exactly the same charging arrangement may be used to transfer negative charges to the pellets from the high voltage electrode 18, simply by reversing the polarity of the charging voltage, so that the charging electrode 66 is negative relative to the induction electrode 68.

If the relative direction of movement of the pellets 26 is reversed, the charging arrangement of FIG. 2 becomes a discharging arrangement which may be employed on the high voltage electrode 18 to discharge the pellets. Such a discharge arrangement is illustrated in FIG. 3. It will be seen that the discharge arrangement is essentially the same as the charging arrangement with the positions of the electrodes reversed so that the relative direction of movement of the pellets 26 is reversed. Thus, the discharging arrangement of FIG. 3 comprises a discharging electrode 86 and an induction electrode 88, disposed in closely-spaced relation along the flight of the pellets 26. The induction electrode 88 is spaced from the pellets, while the discharging electrode 86 is adapted to be contacted by the pellets.

As before, the discharging electrode 86 is formed with a bore 90 which is slidably engaged by the pellets 26. The induction electrode 88 is provided with a large bore 92, spaced outwardly from the pellets. The discharging electrode has an enlarged exit housing or shield 94 with an enlarged bore 95 therein.

Each pellet 26 gives up its charge to the discharging electrode 86. The charge passes outwardly to the high voltage electrode 18 and is accumulated on the outside of the high voltage electrode. The discharging electrode 86 and the induction electrode 88 are constructed and arranged so as to prevent any substantial sparking between the pellet and the discharging electrode.

Means are provided on the high voltage electrode 18 to produce an induction voltage between the induction electrode 88 and the discharging electrode 86. The induction voltage on the induction electrode 88 should be opposite in sign to the charges on the pellets 26 so that the charges will be bound on the pellets when they touch the discharging electrode 86. In the specific arrangements shown in FIG. 3, the pellets 26 carry positive charges. The negative induction voltage on the electrode 88 displaces and binds the positive charge on each pellet so that the charge does not pass abruptly to the discharging electrode 86 when the pellet contacts the discharging electrode. The charge is progressively released to the discharging electrode 86 as the pellet moves out of the induction electrode 88 and into the discharging electrode 86. This arrangement prevents any substantial sparking between the pellet and the discharging electrode 86 at the instant of contact. The construction of the enlarged exit housing or shield 94 prevents sparking when the pellet breaks contact with the discharging electrode 86. As before, the exit housing 94 produces a field free space within the bore 95. As the pellet emerges from the bore 90, it moves into the field free space. Thus, there is no substantial electric field to produce a spark at the instant when the pellet breaks contact with the discharging electrode 86. The prevention of sparking is an important feature, because such sparking would rapidly damage the discharging electrode.

The induction voltage is preferably provided by producing a voltage drop between the discharging electrode 86 and the high voltage electrode 18. This voltage drop is impressed between the discharging electrode 86 and the induction electrode 88, so that the voltage drop becomes the induction voltage. The voltage drop may be obtained by connecting a resistance element 98 between the discharging electrode 86 and the high voltage electrode 18. The resistance element 98 is preferably in the form of a resistor of high value, but may also be in the form of a corona discharge gap.

FIG. 3 illustrates the discharging arrangement at the end of the first flight 41 of the endless member 24. Exactly the same discharging arrangement may be employed at the end of the third flight 43, which also carries positive charges to the high voltage electrode 18. The two discharging electrodes 86 and the two induction electrodes 88 may be connected in parallel, as illustrated in FIG. 1.

As already indicated, the flights 42 and 44 are employed to carry negative charges from the high voltage electrode 18 to the grounded supports 14 and 16. The arrangements for charging the pellets at the beginning of the flights 42 and 44 may be exactly the same as shown in FIG. 2, except that the polarity of the voltage between the charging and induction electrodes 66 and 68 is reversed. The voltage drop across the resistor 98 is preferably employed as the charging voltage. Thus, the charging electrodes 66 on the high voltage electrode 18 are connected directly to the high voltage electrode, while the induction electrodes 68 are connected to the discharging electrodes 86. These connections will be evident from FIG. 1.

The distribution of the electric fields around the high voltage electrode 18 may be improved by providing spaced shielding rings 104 between the high voltage electrode and the grounded supporting walls 14 and 16. The rings 104 are arranged in two similar series between the high voltage electrode 18 and the two supporting plates 14 and 16. The rings 104 are graduated in diameter to provide a regular progression between the inside diameter of the tank 12 and the smaller outside diameter of the high voltage electrode 18. It will be seen that the rings 104 extend around and are spaced outwardly from the endless pellet string 24 of the charge-carrying conveyor 22. The rings 104 provide shielding for the space around the pellet string 24. In cross section, the rings are preferably circular. They may be either solid or hollow.

The total voltage between the high voltage electrode 18 and the tank 12 is divided among the gaps between the successive rings 104 so that a much greater degree of uniformity is achieved in the potential gradient around the high voltage electrode. Thus, the provision of the rings greatly reduces the possibility of high voltage flash-overs. As a result, the generator is capable of developing much higher voltages before the danger of flash-overs becomes a problem. To improve the distribution of voltage along the series of rings 104, corona discharge gaps 106 may be provided between the rings. The leakage currents due to the corona discharges have the effect of equalizing the voltage drops between the successive rings. In effect, the corona gaps provide high resistance leakage paths between the successive rings. Thus, the corona gaps act as voltage-dividing resistance elements. Actual resistors of high value may be substituted for the corona gaps, if desired.

In the illustrated construction, there are nine of the rings 104 between the high voltage electrode 18 and each of the supporting plates 14 and 16. Thus, the total voltage is divided among ten gaps, so that one-tenth of the total voltage appears between the successive rings.

FIGS. 1 and 10 illustrate the construction and arrangement of the insulators 21, which are employed to support the high voltage electrode 18. The insulators 21 also support the shielding rings 104. It will be seen that a large number of individual insulators are employed, and that the insulators are connected between the rings 104, and also between the high voltage electrode 18 and the adjacent rings 104, so that the insulators 21 and the shielding rings 104 form a cage-like structure to support the high voltage electrode.

As illustrated in FIG. 10, each of the insulators 21 is in the form of an insulating rod, preferably cylindrical in shape, which is considerably longer than the spacing between the adjacent rings 104. The ends of the cylindrical insulators 21 are connected to the high voltage electrode 18 and the rings 104 by means of angle brackets 107. Preferably, the L-shaped brackets 107 are made of metal and are bonded or otherwise secured to the ends of the insulators 21. The bonded joints may be formed by the method disclosed and claimed in the co-pending application of Raymond G. Herb, Ser. No. 557,787, filed June 15, 1966, entitled "Method of Bonding Ceramic Members or the Like." The insulators 21 are preferably made of a ceramic material, such as an aluminum oxide ceramic. The angle brackets 107 may be screwed, welded or otherwise secured to the high voltage electrode 18 and the rings 104.

For the sake of structural rigidity, it is preferred to employ three or more of the insulators 21 between each adjacent pair of rings 104, and also between the high voltage insulator 18 and each of the adjacent rings. The insulators 21 are staggered around the rings 104 so as to maintain adequate spacing between the adjacent insulators.

Inasmuch as the insulators 21 are considerably longer than the gaps between the rings 104, the insulators provide a high degree of resistance to flash-overs or other electrical failures. The insulator assemblies are easy to make, inexpensive and easy to connect to the high voltage electrode 18 and the rings 104.

It is preferred to maintain the insulators 21 under compression rather than under tension. To insure that all of the insulators will be under compression, the rings 104 and the high voltage electrode 18 may be assembled so that a general compressive force of substantial magnitude is exerted against the outermost rings.

FIG. 11 illustrates a modified insulator arrangement, in which two insulators 108 are employed in series between adjacent rings 104. Here again, angle brackets 109 are employed to secure the insulators 108 to the rings 104 and the high voltage electrode 18. The brackets 109 are similar to the brackets 107 of FIG. 10 but are reversed in position. The insulators 108 extend in opposite directions from the brackets 109. As before, the insulators 108 are preferably made of ceramic or other suitable insulating materials, while the brackets 109 are preferably made of metal. One end of each insulator 108 may be bonded or otherwise secured to one of the brackets 109.

In the construction of FIG. 11, the remote ends of the insulators 108 are connected together by means of a C-shaped bracket 110 which is preferably made of metal. The ends of the insulators 108 are bonded or otherwise secured to the bracket 110. The arch-like shape of the bracket 110 insures that there will be adequate spacing between the bracket 110 and the angle brackets 109.

The insulator construction of FIG. 11 has the advantage that two insulators are connected in series across each gap between the adjacent rings. Thus, the insulators afford great resistance to flash-overs or other insulator failures.

The insulator arrangement of FIG. 11 has the additional advantage that the insulators 108 may be loaded in compression by applying a general tensile force between the outermost shielding rings 104. The tensile loading produces a highly stable support for the high voltage electrode 18 and the shielding rings 104. Moreover, the weight of the high voltage electrode 18 tends to produce compressive loading in most of the insulators 108.

The insulator assemblies of FIG. 11 are staggered around the rings 104 to provide ample spacing between the adjacent assemblies. It will be understood that the brackets 109 are screwed, welded or otherwise secured to the high voltage electrode 18 and the rings 104.

The insulator construction of FIG. 10 has the advantage that the insulator assemblies occupy less space, so as to leave more room for the charge-carrying pellet strings and the accelerating tube. In addition, the insulating construction of FIG. 10 is easier to make and more economical.

FIG. 4 illustrates a modified charging arrangement which may be substituted for the charging arrangement of FIG. 2. Like the charging arrangement of FIG. 2, the arrangement shown in FIG. 4 comprises a charging electrode 116 and a closely spaced induction electrode 118, disposed along the flight of the pellets 26. A charging voltage is applied between the electrodes 116 and 118. The pellets 26 actually touch the charging electrode 116 but move past the induction electrode 118 in spaced relation thereto. Preferably, the charging electrode 116 takes the form of a sleeve having a bore 120 therein, adapted to be engaged by the pellets 26. The induction electrode 118 is formed with a larger bore 122 which is spaced outwardly from the pellets. As before, the charging electrode 116 has an enlarged entrance housing or shield 123.

The charging arrangement of FIG. 4 differs from that of FIG. 2 in that the charging electrode 116 is formed with at least one finger 124 which extends along the flight of the pellets 26 from the main body of the charging electrode. A slot or notch 126 is formed in the induction electrode 118 to accommodate the finger 124. The slot 126 is larger than the finger 124 to maintain the required spacing between the electrodes 116 and 118.

The finger 124 has the advantage of maintaining contact with each pellet 26 for a longer period of time, until the pellet 26 is entirely within the induction electrode 118. The electric field produced by the induction electrode 118 binds the charge on the pellet 26 so that there is no substantial sparking when the pellet breaks contact with the finger 124.

FIG. 6 illustrates another charging arrangement in which the charging electrode takes the form of a pulley or sheave 132 which engages and supports the pellets 26. The charging arrangement of FIG. 6 may be employed on one of the grounded supports or on the high voltage electrode, simply by reversing the polarities of the induction voltages, or by reversing the direction of movement of the pellets. Thus, the pulley 132 may be mounted on one of the grounded supports or on the high voltage electrode. For clarity of description it will be assumed that the pulley 132 is to be substituted for the pulley 52 shown in FIG. 1.

The arrangement shown in FIG. 6 is adapted to transfer positive charges to the outgoing pellets 26 in the flight 41, while transferring the negative charges from the incoming pellets of the flight 44 to the pulley 132. At the beginning of the outgoing flight 41, an induction electrode 134 is provided to prevent sparking between the pellets and the pulley 132. The induction electrode 134 is closely spaced from the pulley 132 and is disposed along the flight 41 from the pulley. The illustrated induction electrode 134 is in the form of a sleeve having a bore 136 which is spaced outwardly from the pellets 26. A notch or slot 138 is formed in the electrode 134 to receive the edge portion of the pulley 132. The slot 138 is wide enough to provide space between the pulley 132 and the induction electrode 134.

By means of a suitable power supply 140, a negative voltage is applied between the induction electrode 134 and the pulley 132. For convenience, the pulley 132 is grounded through its supporting shaft 142.

The induction electrode 134 draws a positive charge into each pellet before it breaks contact with the pulley 132. This charge is bound on the pellet by the induction electrode 134, so that there is no substantial sparking as the pellet breaks contact with the pulley 132.

Another induction electrode 144 is provided along the incoming flight 44 of the pellets 26, as they approach the pulley 132. The second induction electrode 144 is the same in construction as the electrode 134. A suitable power supply 150 is provided to produce a positive induction voltage between the electrode 144 and the pulley 132. This positive voltage binds the negative charges on the pellets 26 until after they touch the pulley 132. Thus, the induction electrode 144 substantially eliminates sparking between the incoming pellets 26 and the pulley 132. The pulley 132 is preferably made of metal or other conductive material. As shown in FIG. 6, the pellets 26 travel part way around the pulley 132, which serves as an end pulley. However, the pulley 132 may also serve as an intermediate pulley which is engaged at diametrically opposite points by the pellet flights as they move in opposite directions. For use as an intermediate pulley on the high voltage electrode, the polarities of the induction voltages are reversed.

FIGS. 12 and 13 illustrate a modified charging system which is quite similar to that illustrated in FIGS. 6 and 7. However, in the charging system of FIG. 12, a U-shaped housing 151 is employed as the induction electrode. The U-shaped housing 151 replaces the tubular sleeve 134 of FIG. 6. The open side of the U-shaped electrode 151 affords clearance for the pulley 132.

FIG. 8 illustrates another modified charging system which is basically similar to that shown in FIG. 6. The system of FIG. 8 employs the induction electrodes 134 and 144 of FIG. 6. However, the pulley 132 is replaced wth a pulley 152 which is made of nylon or other similar material. To make electrical contact with the pellets 26, the pulley 152 is provided with a conductive rim 154 which may be made of conductive rubber or the like. The pulley 152 is supported by a shaft 156 which is grounded. A radial conductive member 158 extends between the conductive rim 154 and the shaft 156, so as to ground the rim 154.

It has been found that the metal pellets 26 run very quietly and smoothly around the nylon pulley 152. In this respect, the nylon pulley is to be preferred over a pulley made of solid metal.

The induction electrode 134 is supplied with a negative voltage from a suitable power supply, in the same manner as in the system of FIG. 6. However, to avoid the necessity for two power supplies, the induction electrode 144 is supplied with positive voltage by a corona electrode 160 which extends close to the flight of the outgoing positively charged pellets 26. The corona electrode 160 may be in the form of a needle point which projects close to the pellets 26. A grounded electrode 164 is provided near the path of the pellets, opposite the corona electrode 160, to control the effective voltage of the pellets as they pass the corona electrode.

The corona electrode 160 drains off portions of the positive charges from the pellets 26 and supplies the positive charges to the induction electrode 144. After a short period of operation, the positive voltage on the induction electrode 144 builds up to a value corresponding closely to the voltage on the pellets 26, so that the corona current to the electrode 160 drops to a low value. Thus, the corona electrode 160 does not materially reduce the magnitude of the charges which are carried to the high voltage electrode.

FIG. 8 also illustrates the charging and discharging system which is provided on the high voltage electrode 18. Such system comprises a pulley 152a which is the same as the pulley 152. The pulley 152a has a supporting shaft 156a which is connected to the high voltage electrode 18 and thus is at the same voltage as the high voltage electrode. Induction electrodes 134a and 144a are mounted adjacent the pulley 152a. These induction electrodes 134a and 144a are the same as the electrodes 134 and 144. However, the induction electrode 134a is positively charged, while the electrode 144a is negatively charged, relative to the high voltage electrode 18. These charges are obtained from the charged pellets by means of corona electrodes 160a and 160b. The corona electrode 160a is connected to the induction electrode 144a and is arranged to project near the negatively charged pellets 26 of the flight 44, so that negative charges will be transferred to the induction electrode 144a. The other corona electrode 160b is connected to the induction electrode 134a and is arranged to project near the positively charged pellets 26 of the flight 41. Thus, the positive charges are transferred to the induction electrode 134a. The corona electrodes 160a and 160b are associated with voltage control electrodes 164a and 164b which are connected to the high voltage electrode 18.

It will be observed that the pulley 152a is an intermediate pulley, engaged at diametrically opposite points by the pellet flights 41 and 44. The charging and discharging system for the other two pellet flights 42 and 43 may be the same as illustrated in FIG. 8.

FIG. 9 illustrates a modified endless member 174 for the charge-carrying conveyor, adapted to be employed instead of the endless member 24 of FIG. 1. As shown in FIG. 9, the endless member is in the form of a chain having a series of links 176 with charge-carrying pellets 178 mounted thereon. The chain includes insulating elements 180 which are connected between the pellets 178. As shown, the insulating elements 180 take the form of cylinders or other members made of ceramic or other insulating material. Each link 176 incorporates one of the insulating members 180. The insulating members 180 are bonded or otherwise secured to the pellets 178, which are made of metal or other conductive material.

Each pellet 178 is circular in cross section and generally cylindrical in shape. As shown, one end of each pellet is formed with a cavity 182 having a flat end surface 184 against which the insulating member 180 is bonded. The opposite end of each pellet 178 is provided with an axially projecting lug 186 which is pivotally connected to the corresponding lug on the adjacent link 176 of the chain. The lugs 186 are formed with openings 188 adapted to receive pivot pins 190.

The pellet chain 174 has the advantage that it will not stretch, even after prolonged use. Moreover, the ceramic insulating members 180 are highly resistant to damage due to sparking or flash-overs.

FIG. 14 illustrates a modified system for deriving induction voltages from the charged pellets 26. The system of FIG. 14 may be substituted for the system of FIG. 8, comprising the corona discharge electrode 160 and the voltage control electrode 164. In the system of FIG. 14, the voltage control electrode 164 remains the same, but the corona discharge electrode 160 is replaced with an electrode 192 which is radioactive so that it produces appreciable ionization of the atmosphere around the electrode. The radioactive electrode 192 is located near the path of the charged pellets 26, so that portions of the charges on the pellets pass across the ionized atmosphere to the radioactive electrode. The radioactive electrode 192 may be connected to one of the induction electrodes, such as the induction electrode 144, as illustrated in FIG. 8. The induction electrode soon is charged to a voltage corresponding closely to the effective voltage on the pellets 26, whereupon the current drawn by the radioactive electrode 192 from the pellets drops to a very low value, merely sufficient to supply leakage. The conductivity of the atmosphere around the radioactive electrode 192 is slight and is confined to the immediate vicinity of the electrode, so that there is no substantial loss of the charges from the pellets to the voltage control electrode 164.

Only a small amount of radioactive material needs to be provided on the radioactive electrode 192. Any suitable radioactive material may be employed. For example, a small amount of polonium may be plated onto or otherwise mounted on the electrode 192.

By producing capacitance to ground, the voltage control electrode 164 reduces the effective voltage on the pellets, as they pass near the voltage control electrode. In this way, the voltage control electrode prevents the development of an excessive voltage on the induction electrode which is connected to the corona electrode 160 of FIG. 8, or the radioactive electrode 192 of FIG. 14. The voltage on the induction electrode may be adjusted by changing the spacing between the voltage control electrode 164 and the pellets 26.

FIG. 15 illustrates a modified system utilizing a voltage control electrode 194 which is cylindrically curved, rather than being in the form of a flat plate or disc, as in the case of the voltage control electrode 164 of FIG. 8. The cylindrically curved electrode 194 is parallel to the path of the pellets 26, and is spaced outwardly therefrom. The curved voltage control electrode 194 provides a greater capacitance between the pellets and ground, so as to reduce the effective voltage on the pellets as they pass the voltage control electrode. The system of FIG. 15 is otherwise the same as illustrated in FIG. 8.

The voltages on all of the induction electrodes may be derived from the charged pellets, by means of corona discharge electrodes or radioactive electrodes, of the types illustrated in FIGS. 8, 14 and 15. In this way, it is possible to dispense with a power supply. If desired, a power supply may still be used for starting the operation of the charging system, but the charging system will actually start by itself, without the aid of a power supply, due to stray charges picked up by the moving pellets.

However, it is preferred to employ a power supply to provide a stable controlled voltage for at least one of the induction electrodes, as illustrated in FIG. 8, even though the power supply could be eliminated by connecting the induction electrode to a corona discharge needle located adjacent the opposite pellet string. The provision of a power supply affords greatly improved control over the voltage which is developed on the high voltage electrode of the electrostatic machine.

It may be helpful to conclude with a brief review of the operation of the high voltage generator as shown in FIG. 1. The conductive pellets 26 on the endless pellet string 24 carry charges to and from the high voltage electrode 18. The insulating cord 28 which carries the pellets 26 prevents leakage of the accumulated charges from the high voltage electrode 18. The pellet string has the important advantage that it will withstand sparking or flash-overs without being damaged.

All four flights 41–44 of the pellet string 24 participate in the charging of the high voltage electrode 18. The pellet flights 41 and 43 carry positive charges to the high voltage electrode 18. These positive charges are derived from the power supply 70. The other flights 42 and 44 carry negative charges from the high voltage electrode 18 to the grounded supports 14 and 16. At the beginning of each of the flights 41–44, the pellets are charged by contact with one of the charging electrodes 66. These electrodes carry positive voltages at the beginning of the flights 41 and 43, and negative voltages at the beginning of the flights 42 and 44. The induction electrodes 68 are given oppositely polarized voltages to draw the charges to the leading end portions of the pellets as they break contact with the charging electrodes 66 so as to eliminate sparking between the pellets and the charging electrodes.

At the end of each of the four flights 41–44, the pellets transfer their charges to one of the discharging electrodes 86. Before doing so, the pellets travel through the field of the associated induction electrode 88 so that the charge is bound to the pellet until after the pellet makes contact with the discharging electrode. This arrangement eliminates sparking between the pellets and the discharging electrodes.

To transfer positive charges to the high voltage electrode 18, the induction electrodes 88 are given a negative voltage relative to the corresponding discharging electrodes 86. To transfer the negative charges to the grounded supports 14 and 16, the induction electrodes 88 are given a positive voltage relative to the grounded discharging electrodes 86.

On the high voltage electrode 18, the voltages for the induction electrodes 68 and 88 are derived from the voltage drop across the resistor 98 which carries the charging currents to the high voltage electrode. This arrangement eliminates the need for any power supply in the high voltage electrode. The power supply 70 is employed to provide the charging and induction voltages for the charging systems at the grounded ends of the charge-carrying conveyor 22.

A plurality of endless pellet strings may be employed to increase the charge-carrying capacity of the conveyor 22. In this way, the voltage on the high voltage electrode 18 may be built up rapidly. Moreover, the current-generating capacity of the high voltage generator is increased. The pellet strings have the advantage of being highly resistant to sparking and flash-over. Even if a flash-over occurs along one of the pellet strings, there will be no damage to the pellet string, so that the operation of the high voltage generator may be continued without interruption.

The pellet strings will give long and trouble-free service. The pellet strings may be charged and discharged without sparking at the charging and discharging electrodes, so that there is no erosion or other damage to the electrodes.

Various modifications, alternative constructions and equivalents may be employed without departing from the true spirit and scope of the invention as exemplified in the foregoing description and defined in the following claims.

We claim:
1. In a high voltage generator,
the combination comprising a supporting member,
an insulated high voltage electrode spaced a substantial distance from said supporting member,
said electrode being hollow and having a chamber therein,
an endless charge-carrying conveyor having at least one flight extending between said supporting member and said high voltage electrode and extending into said chamber therein,
said conveyor comprising an endless insulating cord having a series of spaced conductive charge-carrying members mounted thereon,
said conveyor including means for moving said flight between said supporting member and said high voltage electrode,
means adjacent said supporting member for charging said charge-carrying members at the beginning of said flight,
and means within said chamber in said high voltage electrode for transferring the charges from said charge-carrying members to said high voltage electrode,
said charge-carrying members having cylindrical symmetry about the longitudinal axis of said cord and projecting radially outwardly from said cord, whereby the charge-carrying capacity of said members is enhanced.

2. In a high voltage generator,
the combination comprising a supporting member,
an insulated high voltage electrode spaced a substantial distance from said supporting member,
said high voltage electrode having a chamber therein,
a charge-carrying conveyor including an endless member having at least one flight extending between said supporting member and said high voltage electrode and into said chamber therein,
said conveyor including means for moving said flight of said endless member between said supporting member and said high voltage electrode,
said endless member comprising a series of conductive charge-carrying pellets spaced therealong with insulating elements extending between the successive pellets,
means adjacent said supporting member for transferring charges to said pellets at the beginning of said flight,
and means within said chamber in said high voltage electrode for transferring the charges from said pellets to said high voltage electrode,
said charge-carrying pellets having cylindrical symmetry about the longitudinal axis of said endless member and projecting radially outwardly from said insulating elements to enhance the charge-carrying capacity of said pellets.

3. A high voltage generator according to claim 2,
in which said endless member of said conveyor takes the form of an endless chain having a plurality of links,
said pellets being mounted on said links.

4. A high voltage generator according to claim 2,
in which said endless member of said conveyor comprises a flexible continuous tension member made of insulating material,
said pellets being in the form of conductive beads strung onto and secured to said tension element at spaced points therealong.

5. In a high voltage generator,
the combination comprising a supporting member,
an insulated high voltage electrode spaced a substantial distance from said supporting member,
said high voltage electrode having a chamber therein,
a charge-carrying conveyor including an endless member having at least one flight extending between said supporting member and said high voltage electrode and extending into said chamber therein,
said endless member including a series of conductive charge-carrying pellets with insulating elements extending therebetween,
charging means adjacent said supporting member for charging said pellets at the beginning of said flight,
discharging means in said chamber within said high voltage electrode for transferring the charges from said pellets to said high voltage electrode,
said charging means including a transfer electrode which is conductively engageable by said pellets at the beginning of said flight,
an induction electrode disposed in closely spaced relation to said transfer electrode and along said flight for inducing charges in said pellets as said pellets leave said transfer electrode,
and means for producing a charging voltage between said transfer electrode and said induction electrode,
said charge-carrying pellets having cylindrical symmetry about the longitudinal axis of said endless member and projecting radially outwardly from said insulating elements to enhance the charge-carrying capacity of said pellets.

6. A high voltage generator according to claim 5,
in which said discharging means comprise a discharging electrode within said chamber and conductively engageable by said pellets at the end of said flight,
an additional induction electrode disposed along said flight and in closely spaced relation to said discharging electrode for temporarily binding the charges on said pellets as said pellets engage said discharging electrode,
and means for connecting said discharging electrode to said high voltage electrode while producing an induction voltage between said discharging electrode and said additional induction electrode.

7. A high voltage generator according to claim 5,
in which said transfer electrode takes the form of a first annular member having a bore therein for slidably receiving said pellets,
and in which said induction electrode takes the form of a second annular member closely spaced along said flight from said first annular member and having an enlarged bore for receiving said pellets in outwardly spaced relation thereto.

8. A high voltage generator according to claim 5,
in which said transfer electrode takes the form of a pulley for conductive engagement by said pellets at the beginning of said flight,
and in which said induction electrode is closely spaced from said pulley and along said flight,
said induction electrode having an opening therein for receiving said pellets in outwardly spaced relation thereto.

9. A high voltage generator according to claim 6,
in which said last mentioned means comprise means for producing a voltage drop between said discharging electrode and said high voltage electrode,
and means for applying said voltage drop between said discharging electrode and said additional induction electrode.

10. In a high voltage generator,
the combination comprising a supporting member,
an insulated high voltage electrode spaced a substantial distance from said supporting member,
said high voltage electrode having a chamber therein,
a charge-carrying conveyor including an endless member having at least a first flight extending between said supporting member and said high voltage electrode and extending into said chamber therein,
said endless member including at least a second flight extending out of said chamber and between said high voltage electrode and said supporting member,
said endless member having a series of spaced conductive pellets mounted thereon with insulating elements between said pellets,
first charging means adjacent said supporting member for transferring charges of one sign to said pellets at the beginning of said first flight,
first discharging means within said chamber for transferring said charges from said pellets to said high voltage electrode at the end of said first flight,
second charging means within said chamber for transferring charges of the opposite sign from said high voltage electrode to said pellets at the beginning of said second flight,
and second discharging means adjacent said supporting member for discharging said pellets at the end of said second flight,
said charge-carrying pellets having cylindrical symmetry about the longitudinal axis of said endless member and projecting radially outwardly from said insulating elements to enhance the charge-carrying capacity of said pellets.

11. A high voltage generator according to claim 10,
in which said first charging means and said second discharging means include a pulley for conductively engaging said pellets between the end of said second flight and the beginning of said first flight,
said first charging means including a first induction electrode disposed along said first flight in closely spaced relation to said pulley,
said first charging means including a power supply for producing a charging voltage of a sign opposite to said one sign between said first induction electrode and said pulley,
said second discharging means including a second induction electrode disposed along said second flight in closely spaced relation to said pulley,
and a corona electrode connected to said second induction electrode and disposed closely adjacent said pellets along said first flight from said first induction electrode for transferring portions of the charges from said pellets to said second induction electrode for producing an induction voltage on said second induction electrode,
said induction voltage being of the same sign as said one sign and being opposite in polarity to the charging voltage on said first induction electrode.

12. A high voltage generator according to claim 10,
in which said first discharging means and said second charging means including a pulley for conductively engaging said pellets at the end of said first flight and at the beginning of said second flight,
said pulley being connected to said high voltage electrode,
said first discharging means including a first induction electrode disposed along said first flight in closely spaced relation to said pulley,
said second charging means including a second induction electrode disposed along said second flight in closely spaced relation to said pulley,
first and second corona electrodes disposed along said respective first and second flights in closely spaced relation to said pellets,
said first corona electrode being connected to said second induction electrode while second corona electrode is connected to said first induction electrode for producing induction voltages on said first and second induction electrodes of opposite polarities relative to said high voltage electrode.

13. A high voltage generator according to claim 10,
in which said first charging means and said second discharging means include electrode means for conductively engaging said pellets at the beginning of said first flight and at the end of said second flight,
said first charging means including a first induction electrode disposed along said first flight in closely spaced relation to said electrode means,
said second discharging means including a second induction electrode disposed along said second flight in closely spaced relation to said electrode means,
means for producing a charging voltage between said first induction electrode and said electrode means,
and a corona electrode connected to said second induction electrode and disposed adjacent said pellets along said first flight for transferring charges from said pellets to said second induction electrode to produce an induction voltage between said induction electrode and said electrode means,
said induction voltage being of a polarity opposite the polarity of said charging voltage.

14. A high voltage generator according to claim 10,
in which said first discharging means and said second charging means comprise electrode means connected to said high voltage electrode for conductively engaging said pellets at the end of said first flight and at the beginning of said second flight,
said first discharging means comprising a first induction electrode disposed along said first flight and adjacent said electrode means,
said second charging means including a second induction electrode disposed along said second flight and adjacent said electrode means,
and first and second corona electrodes disposed adjacent said pellets along said first and second flights,
said first corona electrode being connected to said second induction electrode while said second corona electrode is connected to said first induction electrode,
said corona electrodes being effective to transfer charges of opposite signs from said pellets to said induction electrodes to produce induction voltages of opposite signs in said first and second induction electrodes relative to said high voltage electrode.

15. In a high voltage generator,
the combination comprising a supporting member,
an insulated high voltage electrode spaced a substantial distance from said supporting member,
said high voltage electrode being hollow and having a chamber therein,
a charge-carrying conveyor including an endless member having at least one flight extending between said supporting member and said high voltage electrode and extending into said chamber,
said endless member including a series of spaced conductive pellets with insulating means between said pellets,
said pellets being generally circular in cross section,
charging means adjacent said supporting member for transferring charges to said pellets at the beginning of said flight,
and discharging means within said chamber for transferring charges from said pellets to said high voltage electrode at the end of said flight,
said charging means including an annular charging electrode having a bore therein for slidably receiving and conductively engaging said pellets,
an annular induction electrode disposed along said flight in closely spaced relation to said charging electrode,
said induction electrode having a bore therein spaced outwardly from said pellets,
and means for producing a charging voltage between said charging electrode and said induction electrode,
said charging electrode having a finger extending therefrom along said flight,
said induction electrode having an opening therein for receiving said finger in spaced relation thereto.

16. A high voltage generator according to claim 10,
in which at least one of said charging and discharging means includes an induction electrode disposed along one of said flights,
and a radioactive electrode connected to said induction electrode and disposed along the other of said flights for transferring charges from said pellets to said induction electrode to produce an induction voltage thereon.

17. A high voltage generator according to claim 10,
in which at least one of said charging and discharging means includes an induction electrode disposed along one of said flights,
and a corona discharge electrode connected to said induction electrode and disposed along the other flight for transferring charges from said pellets to said induction electrode to produce an induction voltage thereon.

18. A high voltage generator according to claim 17,
including a voltage control electrode disposed along said other flight opposite said corona discharge electrode and in spaced relation to said pellets for lowering the effective voltage on said pellets as they pass said corona discharge electrode.

19. A high voltage generator,
comprising the combination of a generally cylindrical tank for holding a dielectric atmosphere,
an insulated high voltage electrode disposed axially in said tank,
a series of shielding rings connected between said high voltage electrode and said tank,
said rings being of progressively increasing diameters between said high voltage electrode and said tank,
a charge-carrying conveyor extending within said rings from at least one end of said tank to said high voltage electrode,
and a plurality of individual insulator assemblies connected between said rings and uniting said rings into a supporting structure for said high voltage electrode,
each insulator assembly being connected between one pair of adjacent rings,
each insulator assembly comprising a pair of brackets mounted on such adjacent rings,
and an insulator extending between said brackets, the length of said insulator being substantially greater than the spacing between such adjacent rings.

20. A high voltage generator,
comprising the combination of a generally cylindrical tank for holding a dielectric atmosphere,
an insulated high voltage electrode disposed axially in said tank,
a series of shielding rings connected between said high voltage electrode and said tank,
said rings being of progressively increasing diameters between said high voltage electrode and said tank,
a charge-carrying conveyor extending within said rings from at least one end of said tank to said high voltage electrode,
and a plurality of insulator assemblies connected between said rings and uniting said rings into a supporting structure for said high voltage electrode,
each of said insulator assemblies comprising a pair of brackets mounted on adjacent rings,
a pair of insulators connected to said brackets and extending in opposite directions therefrom,
and a third generally C-shaped bracket extending between the remote ends of said insulators.

References Cited

UNITED STATES PATENTS

| | | | |
|---|---|---|---|
| 1,991,236 | 2/1935 | Van de Graaf | 310—5 |
| 2,230,473 | 2/1941 | Van de Graaf | 310—5 |
| 2,398,581 | 4/1946 | Delcau | 310—5 |
| 2,503,224 | 4/1950 | Trump et al. | 310—5 |
| 2,578,908 | 12/1951 | Turner | 310—6 XR |
| 2,677,774 | 5/1954 | Nygard | 310—5 |
| 2,697,793 | 12/1954 | Trump et al. | 310—5 |
| 3,048,720 | 8/1962 | Cloud | 310—5 |

FOREIGN PATENTS 782,040   3/1935   France.

MILTON O. HIRSHFIELD, Primary Examiner

D. F. DUGGAN, Assistant Examiner